United States Patent [19]

Bras et al.

[11] Patent Number: 4,545,692
[45] Date of Patent: Oct. 8, 1985

[54] SEAL FOR A ROLLING BEARING UNIT

[75] Inventors: Johan C. M. Bras, Buurmalsen; Antonio Gabelli, Ijsselstein, both of Netherlands

[73] Assignee: SKF Industrial Trading & Development Company B.V., Nieuwegein, Netherlands

[21] Appl. No.: 496,086

[22] Filed: May 19, 1983

[30] Foreign Application Priority Data

Jun. 16, 1982 [NL] Netherlands .................. 8202445

[51] Int. Cl.[4] .................. F16C 33/72; F16C 33/78
[52] U.S. Cl. .................. 384/477; 384/479; 384/482
[58] Field of Search ............ 308/187, 187.1, 187.2; 384/147, 148, 149–153, 477, 479, 481, 482

[56] References Cited

U.S. PATENT DOCUMENTS

| | | | |
|---|---|---|---|
| 2,352,784 | 7/1944 | Geyer | 308/187.1 X |
| 2,393,260 | 1/1946 | Pardee | 308/187.1 |
| 2,916,313 | 12/1959 | Ziller et al. | 308/187.1 |
| 3,370,895 | 2/1968 | Cason | 384/94 |
| 3,797,899 | 3/1974 | Anderson | 308/187.1 |
| 3,813,102 | 5/1974 | Derman | 308/187.1 X |
| 4,040,683 | 8/1977 | Korenhof | 308/187.1 |
| 4,043,620 | 8/1977 | Otto | 308/187.2 |
| 4,118,080 | 10/1978 | Kregler et al. | 308/187.1 |
| 4,253,713 | 3/1981 | Chambers, Sr. | 308/187.1 |
| 4,372,628 | 2/1983 | Kiener et al. | 308/187.1 |

FOREIGN PATENT DOCUMENTS

| | | | |
|---|---|---|---|
| 2254989 | 7/1975 | France. | |
| 1061122 | 3/1967 | United Kingdom | 308/187.1 |
| 1598681 | 9/1981 | United Kingdom | 308/187.1 |

Primary Examiner—Stuart S. Levy
Assistant Examiner—Thomas R. Hannon
Attorney, Agent, or Firm—Yuter, Rosen and Dainow

[57] ABSTRACT

A seal for a rolling bearing unit having an inner and an outer race becoming or forming a unit with an attaching flange and rows of rolling members between the races. The seal comprises an annular element, which at its inner edge, near the raceway of a row of rolling members, may be attached on the inner race and the outer edge of which, at the same time, rests sealingly against the annular main surface of the outer race.

10 Claims, 2 Drawing Figures

SEAL FOR A ROLLING BEARING UNIT

BACKGROUND OF THE INVENTION

The invention relates to a seal for a rolling bearing unit consisting of an inner race and an outer race, becoming or forming a unit with an attaching flange, and rows of rolling members between the races.

A rolling bearing unit of the type mentioned, wherein seals pursuant to the invention are used, is a rolling bearing fully adjusted and lubricated in advance, which may be used directly as such, in particular for the bearing system of the front wheels of a motor vehicle with four-wheel drive.

It is self-evident that in such a rolling bearing unit heavy demands are placed on the seals, since on no account should dirt be able to penetrate into the rolling bearing from outside and, furthermore, the lubricant should not be able to leak out of the bearing. In addition, such a rolling bearing, when used as a wheel bearing for a motor vehicle with four-wheel drive, is subject to extra stresses arising as a result of turning and rotation of the wheels during steering and driving, as well as owing to motive forces. Taking this into account, the seals must be completely yielding at one edge but at the other edge must retain their sealing ability under all circumstances.

Hitherto such seals have comprised an annular member with one or a plurality of springy lips which rest against the inner race, such as shown, for example, in U.S. Pat. No. 4040683.

It has appeared, however, that such seals with springy lips fail to produce effective long-lasting sealing of a rolling bearing of the type mentioned, in particular owing to the aforementioned extra stresses arising during use or to other circumstances, such as relatively high operating temperatures.

SUMMARY OF THE INVENTION

The object of the invention is to provide an improved seal for a rolling bearing unit of the type mentioned which produces effective long-lasting sealing under all operating conditions.

This object is accomplished in that the seal pursuant to the invention comprises a sealing ring which at its inner edge, near the raceway of a row of rolling members, may be attached on the inner race and the outer edge of which at the same time sealingly abuts the annular main surface of the outer race. The sealing ring consists preferably of a springy annular member capable of being attached about the inner race and having a portion oriented toward the annular main surface of the outer race, on which portion is attached a ring of a self-lubricating material, in particular graphite, which, in the assembled state, is pressed by the springiness of the annular member against the aforementioned main surface of the outer race.

In this way the ring of a self-lubricating material is kept constantly pressed against the main surface of the outer race, even when relatively small displacements between inner and outer races occur as a result of the forces exerted on the outer race and other physical circumstances such as the development of high temperatures during braking.

The inner edge of the annular member is preferably formed by a bushing which may be secured about the inner race and within which the remaining portion of the member is connected.

To obtain an effectively springy annular member, this member consists preferably of an elastic material, for example a synthetic material, while a dished spring ring is imbedded in this material, the inner edge of which ring rests against a flange of the bushing projecting outward.

In the dished spring ring there may at the same time be made a plurality of radially oriented recesses extending from the inner edge, so that a plurality of spring fingers lying at like distances apart form a plurality of lips at the inner edge of the dished spring ring, whereby the springiness of the spring ring is improved.

In assembled state one seal may advantageously rest against the flange on the inner race and the second seal be attached about the inner race by means of a concentric protrusion projecting inward and accomodated in a groove in the inner race.

It is noted that U.S. Pat. No. 3,797,899 discloses a seal comprising springy lips which rest against the inner edge of the outer race.

BRIEF DESCRIPTION OF THE DRAWINGS

The invention is described in greater detail with reference to the drawings, in which.

DESCRIPTION OF THE PREFERRRED EMBODIMENT

Figure 1:
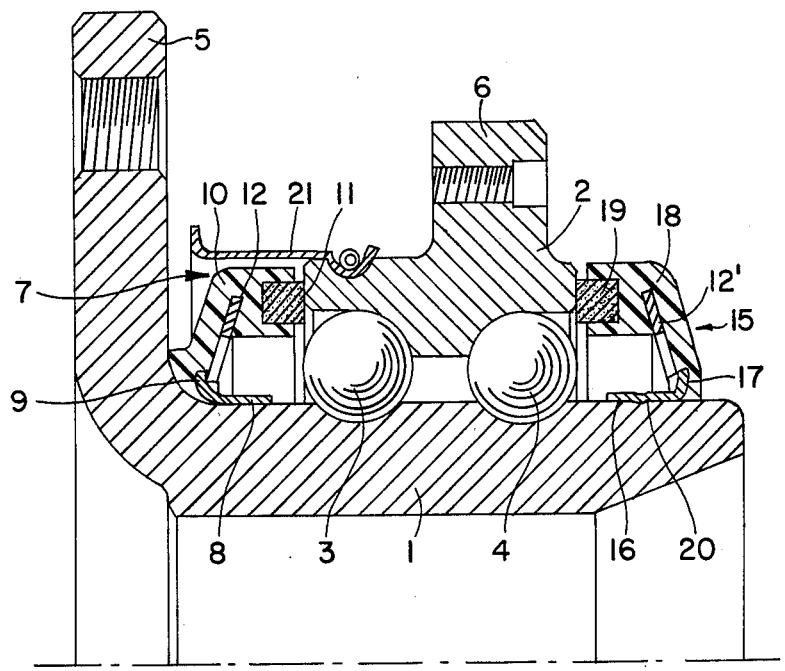
FIG. 1 shows, in axial cross-section, part of a rolling bearing unit wherein are mounted sealing rings pursuant to the invention.

As shown in FIG. 1, the rolling bearing unit comprises and inner race 1 and an outer race 2, between which are placed two rows of rolling members in the form of balls 3 and 4. On the inner race 1 is formed a flange 5 for, for example, attachment of the hub of a wheel, such as a front wheel of a motor vehicle with four-wheel drive. On the outer race 2 is formed a flange 6 for attachment of the rolling bearing, for example when used in driven front wheels on the steering components, whereby the steering forces may be applied on the flange 6.

Figure 2:
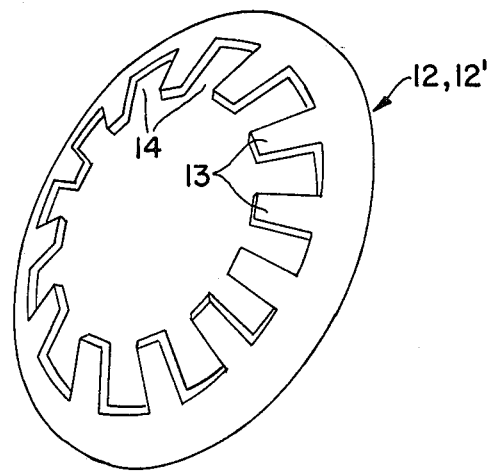
FIG. 2 shows a dished spring ring in perspective.

At the left-hand edge in FIG. 1 is mounted a sealing ring 7, consisting of a bushing 8 with a flange 9, an annular member 10 made of an elastic material, in particular a synthetic material, and a ring 11 made of a self-lubricating material, for example graphite or compounds thereof, which is partially imbedded in the member 10. In addition, a dished spring ring 12 is partially imbedded in the member 10, the inner edge of which ring rests against the flange 9, the inner edge being formed by lips on the spring fingers 13 (see FIG. 2) which spring fingers form recesses 14. This dished spring ring keeps the springiness of the seal constant for a long time, due allowance being made for wear and tear of the ring 11.

As shown in FIG. 1, the sealing ring 7 is mounted about the inner race 1 and at the same time abuts the flange 5.

At the right-hand side in FIG. 1 is mounted a sealing ring 15, which likewise consists of a bushing 16 with a flange 17 and a member 18 made of elastic material, in particular synthetic material, in which is partially imbedded a ring 19 made of a self-lubricating material, such as graphite or a compound thereof. In addition, a dished spring ring 12' is present in the same way as in the case of the sealing ring 7, which ring 12′ has substantially the same shape as the dished spring ring 12.

The rings 11 and 19 need not abut the outer race by way of flat surfaces, as shown. These surfaces may alternatively be provided with grooves, or may be convex.

The bushing 16 is provided with a concentric protrusion 20 projecting inward, which engages a groove in the inner race 1. The bushing 16, however, may alternatively be attached by (self-)clamping near the raceway of the balls 4.

As shown in FIG. 1, the rings of self-lubricating material 11 and 19 are pressed springily against the annular main surfaces of the outer race 2, thereby procuring long-lasting effective sealing.

A protective ring 21 is further mounted about the sealing ring 7, since this portion of the bearing, used as wheel bearing, is directly exposed to eroding conditions, such as splashing gravel, dirt, mud and sand.

We claim:

1. A first seal for a roller bearing unit including an outer race, an inner race with a radially extended attaching flange, and rows of rolling members between said races, comprising:
   a first bushing subject to attachment about said inner race, said bushing including a radial flange at one end, said radial flange facing said attaching flange on said inner race;
   a first springy annular member including elastic material connected at one end to said first bushing and at the other end having a portion oriented toward a first annular main surface on said outer race, said first annular member further including a first dished spring ring, said first spring ring being at least partially imbedded in said elastic maerial, an inner edge of said first spring ring resting against said bushing flange, said resting edge providing a fulcrum for pivotal motion in both axis directions of said first spring ring relative to said first bushing;
   a first ring of a self-lubricating material in contact with said other end of said first springy annular member, in the assembled state of said seal on said roller bearing unit, said self-lubricating material being pressed against said first annular main surface of said outer race by springiness of said first annular member.

2. A seal as claimed in claim 1, wherein said self lubricating material is graphite.

3. A seal as claimed in claim 1, wherein said elastic material is synthetic.

4. Seal according to claim 1, characterized in that in the dished spring ring (12,12′) is made a plurality of radially oriented recesses (14) extending from the inner edge, so that at the inner edge of the dished spring ring is present a plurality of lips (13) lying at like distances apart.

5. A seal and roller bearing unit as claimed in claim 1, and further comprising:
   a second bushing subject to attachment about said inner race, said second bushing including a radial flange at one end away from said rolling members and said attaching flange;
   a second springy annular member including elastic material connected at one end to said second bushing and at the other end having a portion oriented toward a second annular main surface on said outer race, said second annular main surfaace being on the opposite side of said rolling members from said first annular main surface, said second annular member further including a second dished spring ring, said second spring ring being at least partially embedded in said elastic material, the inner edge of said second spring ring resting against said second bushing flange, said resting providing a fulcrum for pivotal motion of said second spring ring relative to said second bushing;
   a second ring of a self-lubricating material in contact with said other end of said second springy annular member, in the assembled state of said second seal on said rolling bearing unit, said self-lubricating material being pressed against said second annular main surface of said outer race by the springiness of said second annular member.

6. Seals as claimed in claim 5, wherein said second dished spring ring is made of a plurality of radially oriented recesses extending from the inner edge, so that said inner edge of said second dished spring ring includes a plurality of lips equally spaced apart.

7. Rolling bearing unit according to claim 5, characterized in that the bushing (16) of the second seal (15) is provided with a concentric protrusion (20) projecting inward and accomodated in a groove in the inner race (1).

8. Rolling bearing unit according to claim 1 or 5, characterized in that a protective ring (21) is mounted about the seal (7,15).

9. A seal for a roller bearing unit including an outer race, an inner race with a radially extended attaching flange, and rows of rolling members between said races, comprising:
   a first bushing subject to attachment about said inner race, said bushing including a radial flange at one end, said radial flange facing said attaching flange on said inner race;
   a first springy annular member including elastic material connected at one end to said first bushing and at the other end having a portion oriented toward a first annular main surface on said outer race, said one end of said first springy annular member being sandwiched between said flange of said first bushing and said attaching flange of said inner race, said first annular member further including a first dished spring ring, said first spring ring being at least partially imbedded in said elastic material, an inner edge of said first spring ring resting against said bushing flange, said resting edge providing a fulcrum for pivotal motion of said first spring ring relative to said first bushing;
   a first ring of a self-lubricating material in contact with said other end of said first springy annular member, in the assembled state of said seal on said roller bearing unit, said self-lubricating material being pressed against said first annular main surface of said outer race by springiness of said first annular member.

10. A seal as claimed in claim 9 wherein said first annular member presses against axial and radial surfaces of said inner race and attaching flange.

* * * * *

UNITED STATES PATENT AND TRADEMARK OFFICE
CERTIFICATE OF CORRECTION

PATENT NO. : 4,545,692
DATED : October 8, 1985
INVENTOR(S) : Johan C.M. Bras, et al It is certified that error appears in the above-identified patent and that said Letters Patent is hereby corrected as shown below:

Column 2, line 35, change "and" to --an--.

Column 4, line 2, change "surfaace" to --surface--.

Signed and Sealed this

Eighth Day of July 1986

[SEAL]

Attest:

DONALD J. QUIGG

Attesting Officer

Commissioner of Patents and Trademarks